(12) United States Patent
Sugar et al.

(10) Patent No.: US 8,495,290 B2
(45) Date of Patent: Jul. 23, 2013

(54) METHODS FOR IMPLEMENTATION OF AN ARRAY OF REMOVABLE DISK DRIVES

(75) Inventors: Robert Sugar, Boulder, CO (US); S. Christopher Alaimo, Boulder, CO (US); Chris Mayne, Boulder, CO (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 13/340,078

(22) Filed: Dec. 29, 2011

(65) Prior Publication Data

US 2012/0096222 A1 Apr. 19, 2012

Related U.S. Application Data

(63) Continuation of application No. 12/238,282, filed on Sep. 25, 2008, now Pat. No. 8,108,601.

(60) Provisional application No. 60/977,797, filed on Oct. 5, 2007.

(51) Int. Cl.
*G06F 13/00* (2006.01)
*G06F 12/00* (2006.01)

(52) U.S. Cl.
USPC ........... 711/112; 711/154; 711/161; 711/162; 711/163

(58) Field of Classification Search
USPC .......................... 711/112, 154, 161, 162, 163
See application file for complete search history.

(56) References Cited

U.S. PATENT DOCUMENTS 7,107,397 B2   9/2006  Dahman et al.
2005/0285951 A1*  12/2005  Takahashi et al. ....... 348/231.99

* cited by examiner

*Primary Examiner* — Midys Rojas
(74) *Attorney, Agent, or Firm* — Kenneth E. Levitt; Dorsey & Whitney LLP

(57) ABSTRACT

Embodiments provide systems and methods for storing data on two or more removable disk drives. The two or more removable disk drives are inserted into a modular drive bay having two or more drive ports. Embodiments of the modular drive bay include a switch to redirect operations to a drive port. By arraying the drive ports, the removable disk drives may be replaced without needing to readdress the removable disk drives when new removable disk drives are inserted. Thus, the modular drive bay does not require configuration changes when new removable disk drives are inserted.

20 Claims, 8 Drawing Sheets

1

METHODS FOR IMPLEMENTATION OF AN ARRAY OF REMOVABLE DISK DRIVES

CROSS-REFERENCES TO RELATED APPLICATIONS

This application is a continuation of U.S. application Ser. No. 12/238,282, filed Sep. 25, 2008, issued Jan. 31, 2012 as U.S. Pat. No. 8,108,601, which claims priority to U.S. Provisional Patent Application Ser. No. 60/977,797, filed Oct. 5, 2007, entitled "METHODS FOR IMPLEMENTATION OF AN ARRAY OF REMOVABLE DISK DRIVES,"both of which are hereby incorporated by reference herein in their entirety.

BACKGROUND

Embodiments of the disclosure generally relate to storage systems and, more specifically, but not by way of limitation, to archiving storage systems.

Governments and other organizations often require the storage of certain types of data for long periods. For example, the Securities and Exchange Commission (SEC) may require retention of financial records for three or more months. Thus, entities that have to meet these storage requirements employ archiving systems to store the data to a media allowing for long-term storage.

Generally, expanding the archiving system can be difficult. Many systems require the user to duplicate the system to add more storage capacity. Other systems require integration of new media, the integration generally requiring configuration changes. The configuration changes allow the existing system to communicate with the added media. The configuration changes generally are difficult and time consuming. As such, there generally is no efficient or easy method for adding additional storage.

It is in view of these and other considerations not mentioned herein that the embodiments of the present disclosure were envisioned.

BRIEF DESCRIPTION OF THE DRAWINGS

The embodiments of the present disclosure are described in conjunction with the appended figures.

Figure 1:
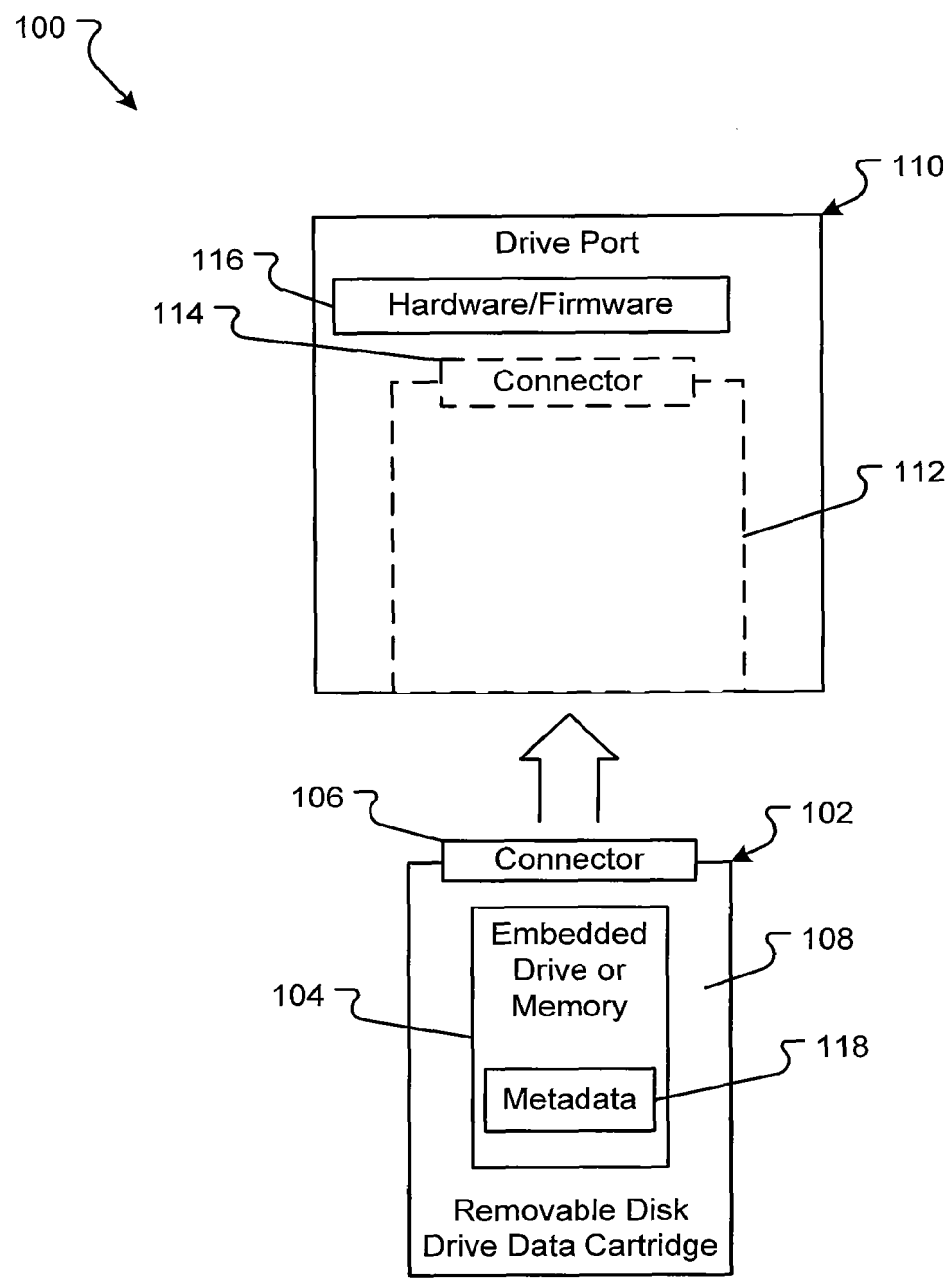
FIG. 1 is a block diagram of an embodiment of a removable cartridge storage system.

In the appended figures, similar components and/or features may have the same reference label. Components with different reference labels can describe different embodiments of the same or similar components.

DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Embodiments of the present disclosure provide unique and novel systems and methods for storing data on two or more removable disk drives. The two or more removable disk drives are inserted into a modular drive bay having two or more drive ports. As such, the storage capacity is very flexible as new removable disk drives can be easily added to unused drive ports in the modular drive bay or by replacing an existing removable disk drive. Embodiments of the modular drive bay includes a switch to redirect operations to a drive port. By arraying the drive ports, the removable disk drives may be replaced without needing to readdress the removable disk drives when new removable disk drives are inserted. Thus, embodiments of the modular drive bay do not require configuration changes when new removable disk drives are inserted or those configuration changes are automatic.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

An embodiment of a removable disk system 100 to provide long-term archival data storage is shown in FIG. 1. A removable disk drive 102 provides storage capability for the removable disk system 100. In embodiments, the removable disk drive 102 includes a data cartridge case 108 and an embedded memory 104, which may be an embedded hard disk drive (HDD), solid state disk (SSD), solid state drive, or flash memory. The HDD or flash memory 104 provides a RAM for storage of archived data. The embedded memory 104 is in communication with and/or electrically connected to a connector 106. In one embodiment, the connector is a Serial Advanced Technology Attachment (SATA) connector. In other embodiments, the connector is a Universal Serial Bus (USB) connector, parallel connector, Firewire connector, or other connector. Both the embedded memory 104 and connector 106 are, in embodiments, physically attached to the data cartridge case 108, and, in some embodiments, enclosed, protected, connected or integrated by the data cartridge case 108. In other embodiments, the embedded memory 104 and the connector 106 are a physically integrated component and the connector protrudes from the data cartridge case 108. The data cartridge case 108, in embodiments, provides a solid container for the embedded memory 104 that also functions as an easily swappable or changed case when interchanging removable disk drives 102 in the removable disk system 100.

The embedded memory 104, in embodiments, includes metadata 118. Metadata 118, in embodiments, allows the archiving system to provide different functionality with the removable disk drive 102. Metadata 118 can include any information about the data stored in the memory 104. The information can include disk identifiers, memory addresses, protection formats for the data, encryption keys, etc. With the metadata 118 stored in the embedded memory 104, the removable disk drive 102 may be physically stored in another location and allow the removable disk drive 102 to be reinserted with the same functionality.

In embodiments, the removable disk system 100 contains a drive port 110 that includes one or more data cartridge ports 112, each with a data cartridge connector 114 to receive the removable disk drive 102. The data cartridge connector 114 mates with the electrical connector 106 of the removable disk drive 102 to provide an electrical connection to the removable disk drive 102 and/or to communicate with the embedded memory 104 in the removable disk drive 102. As with the electrical connector 106, the data cartridge connector 114 may be a SATA connector or another type of connector. Regardless, the data cartridge connector 114 and the electrical connector 106 can be physically and/or electrically connected. The data cartridge port 112 allows the data cartridge case 108 of the removable disk drive 102 to be easily inserted and removed as necessary. In embodiments, the drive port 110 includes two or more data cartridge ports 112 to allow for the use, control and communication with two or more removable disk drives 102. Each drive port 110, in embodiments, is separately addressable to allow for customized control over each removable disk drive 102 connected to each data cartridge port 112. Thus, as removable disk drives 102 are replaced, the same controls can be applied to the newly inserted removable disk drives 102 because the drive port 110 is addressed instead of the removable disk drives 102.

The embedded memory 104 may be read and used by the hardware/firmware 116 of the drive port 110. The hardware/firmware 116 may be hardware and/or software resident in the drive port 110 for controlling the removable disk drive 102. In embodiments, the hardware/firmware 116 contains the necessary software and/or hardware to power-up the removable disk drive 102, spin-up the disk platters in the embedded memory 104, read and write to the embedded memory 104, read, write and process metadata 118, etc. For example, the hardware/firmware 116 could read the embedded memory 104 to identify the removable disk drive 102 and gather information related to its contents.

In embodiments, the removable disk system 100 operates to receive one or more removable disk drives 102 in the one or more drive ports 110. The electrical connector 106 physically connects or couples with the data cartridge connector 114 to form an electrical connection that allows the drive port 110 to communicate with the embedded memory 104. The hardware/firmware 116 powers-up the embedded memory 104 and begins any initialization processes (e.g., security processes, identification processes, reading and/or writing, etc.). The drive port 110, which, in embodiments, is in communication with a network, receives archival data from one or more servers, applications, or other devices or systems on the network. The hardware/firmware 116 writes the archival data to the embedded memory 104 of the removable disk drive 102 to archive the data.

Figure 2:
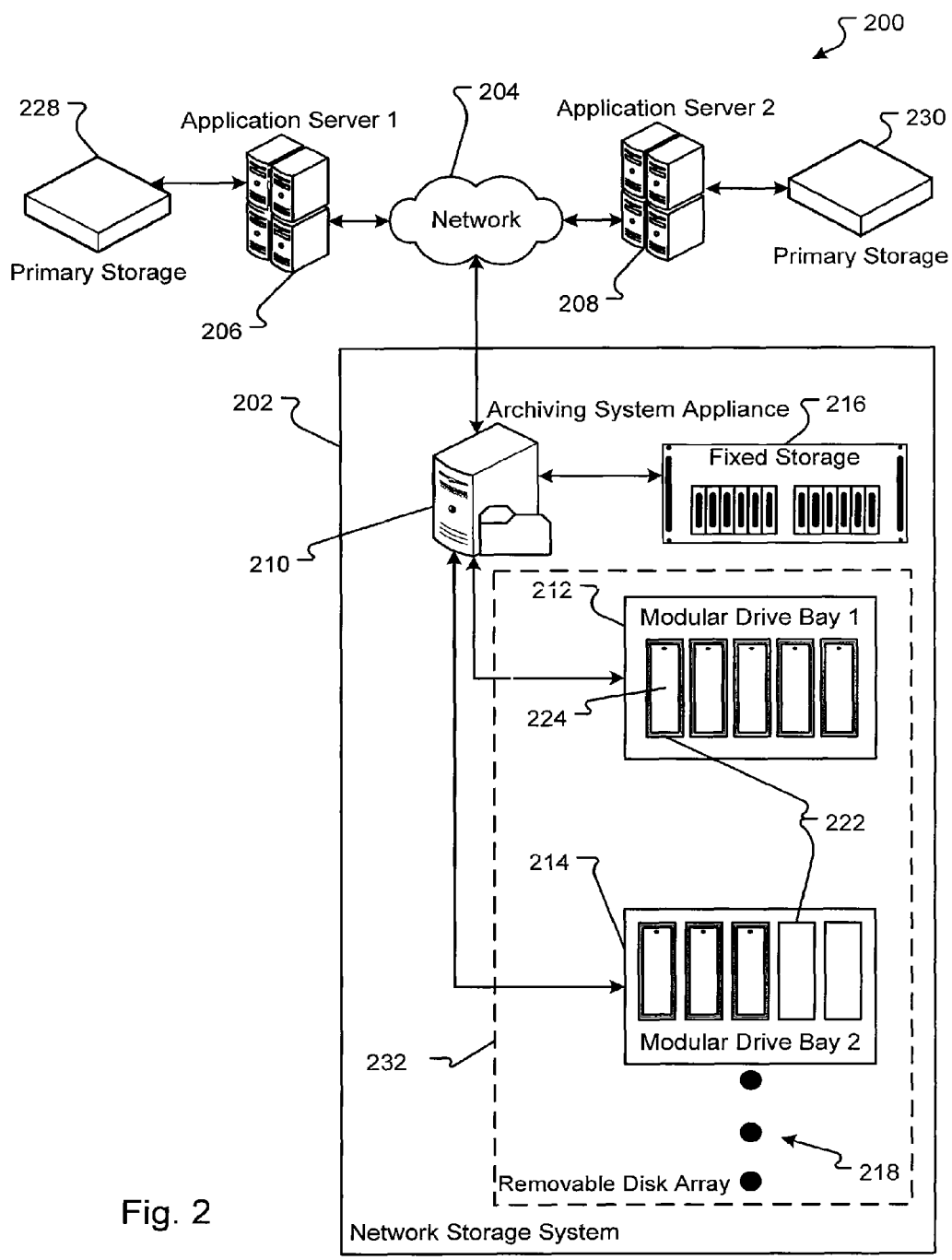
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage system 202 in communication with one or more systems via a network 204. In embodiments, the systems that communicate with the network storage system 202 comprise applications, application servers, other servers, peripherals, other devices and other systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, hardware devices that may store archived data will be referred to as an application or application server. Application server 1 206 and application server 2 208 will hereinafter be used to describe the functions of the archiving system 200 but are not meant to limit the description to the embodiments set forth herein.

The network storage system 202 comprises one or more components that may be encompassed in a single physical structure or be comprised of discrete components. In embodiments, the network storage system 202 includes an archiving system appliance 210 and one or more removable disk drives 224, which may be the same or similar to removable disk drive 102 (FIG. 1), connected or in communication with a drive port 222, which may be the same or similar to drive port 110 (FIG. 1). In alternative embodiments, a modular drive bay 212 and/or 214 includes two or more drive ports 222 that can each connect with a removable disk drive 224. Thus, the modular drive bays 212 and 214 provide added storage capacity because more than one removable disk drive 224 can be inserted and accessed using the same archiving system appliance 210. Further, each drive port 222 in the modular drive bays 212 and 214 are, in embodiments, separately addressable allowing the archiving system appliance 210 to configure the removable disk drives 224 in the modular drive bays 212 and 214 into groups of one or more removable disk drives 224. Two or more modular drive bays 212 and 214, in embodiments, are included in the network storage system 202, as evidenced by the ellipses 218. Thus, as more data storage capacity is required, more modular drive bays 212 and 214 may be added to the network storage system 202. In embodiments, each modular drive bay 212 and 214 may include a single hardware/firmware 116 (FIG. 1) for all drive ports 222 in the modular drive bay 212 and 214. In alternative embodiments, each drive port 222 includes hardware/firmware 116 (FIG. 1).

The exemplary hardware architecture in FIG. 2 provides near limitless capacity as more removable disk drives 224 can be added to existing modular drive bays 212 or 214 until the modular drive bays 212 and 214 hold all possible removable disk drives 224. Then, more modular drive bays 212 and 214 are added to the network storage system 202. Further, removable disk drives 224 may be replaced as the removable disk drives 224 near their storage capacity. The removed disk drives 224, in embodiments, are physically stored if and until the data on the removable disk drives 224 needs to be retrieved. If the data on the removable disk drive 224 needs to be retrieved, the removable disk drive 224 may be inserted into one of the drive ports 222 of the modular drive bay 212 or 214, and the information retrieved from the connected removable disk drive 224.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein. Hereinafter, the archiving system appliance 210 may be referred to as the host.

In embodiments, the two or more modular drive bays 212 and/or 214, having each one or more inserted removable disk drives 224, form a removable disk array (RDA) 232. The archiving system appliance 210 can configure the RDA 232 into one or more independent file systems. Each application server 206 or 208 requiring archiving of data may be provided a view of the RDA 232 as one or more independent file systems. In embodiments, the archiving system appliance 210 logically partitions the RDA 232 into application layer partitions and logically associates one or more drive ports 222 with each application layer partition. An application layer partition is associated with the application server 206 or 208 rather than some arbitrary logical divisions. Thus, the one or more removable disk drives 224 comprising the application layer partition appears as an independent file system.

In further embodiments, the archiving system appliance 210 provides an interface for application server 1 206 and application server 2 208 that allows the application servers 206 and 208 to communicate archival data to the archiving system appliance 210. The archiving system appliance 210, in embodiments, determines where and how to store the data to one or more removable disk drives 224. For example, the application server 1 206 stores archival data in a first application layer drive, such as, the first three removable disk drives. The application layer drives are, in embodiments, presented to the application servers 206 and 208 as application layer drives where write and read permissions for any one application layer drive is specific to one of the application servers. As such, the network storage system 202 provides a multiple and independent file system to each application server 206 and 208 using the same hardware architecture. In embodiments, the archival data is also referred to as an information element and may include, but is not limited to, a file, a memory sector, a data structure, a table, or other type or format of data.

In alternative embodiments, the network storage system 202 also comprises a fixed storage 216. The fixed storage 216 may be any type of memory or storage media either internal to the archiving system appliance 210 or configured as a discrete system. For example, the fixed storage 216 is a Redundant Array of Independent Disks (RAID), such as the Xtore XJ-SA12-316R-B from AIC of Taiwan. The fixed storage 216 provides an active archive for storing certain data for a short period of time where the data may be more easily accessed. In embodiments, the archiving system appliance 210 copies archival data to both the fixed storage 216 and the removable disk drive 224. If the data is needed in the short term, the archiving system appliance 210 retrieves the data from the fixed storage 216. The archiving system appliance 210, in embodiments, sends the archival data to or removes the archival data from the modular drive bay 212 or 214 having a predetermined address to store or retrieve the archival data from a removable disk drive 224.

The archiving system appliance 210 can also configure the active archive in the fixed storage 216 into one or more independent file systems, as with the RDA 232. As explained above, each application server may be provided a view of one of two or more independent file systems. Each independent file system may comprise an application layer partition in the RDA 232 and a related application layer partition in the fixed storage 216. In embodiments, the archiving system appliance 210 partitions the fixed storage 216 and associates each application layer partition in the fixed storage 216 with an associated application layer partition in the RDA 232.

As explained above, the archiving system appliance 210, in embodiments, determines where and how to store the data to one or more removable disk drives 224. For example, the application server 1 206 stores archival data in a first application layer drive, which may include storing the archival data in the application layer partition in the fixed storage 216 for easier access to the archival data. Again, the application layer drives are, in embodiments, presented to the application servers 206 and 208 where write and read permissions for any one application layer drive is specific to one of the application servers. As such, the network storage system 202 provides a multiple and independent file system to each application server 206 and 208 using the same hardware architecture.

In operation, application server 1 206 stores primary data into a primary storage 228, which may be a local disk drive or other memory. After some predetermined event, the application server 1 206 reads the primary data from the primary storage 228, packages the data in a format for transport over the network 204 and sends the archival data to the network storage system 202 to be archived. The archiving system appliance 210 receives the archival data and determines where the archival data should be stored. The archival data, in embodiments, is then sent to the related application layer partitions in both the fixed storage 216 and the RDA 232, which may comprise one or more of the removable disk drives 224 in one or more of the drive ports 222. The archiving system appliance 210 can include a memory address(es) for the data to be stored in the removable disk drive 224. The archival data is written to the removable disk drive 224 for long-term storage and is written to the fixed storage 216 for short-term, easy-access storage. In further embodiments, application server 2 208 writes primary data to a primary storage 230 and also sends archival data to the network storage system 202. In some embodiments, the archival data from application server 2 208 is stored to a different removable disk drive 224 and a different portion of the fixed storage 216 because the archival data from application server 2 208 relates to a different application and, thus, a different application layer partition.

Figure 3:
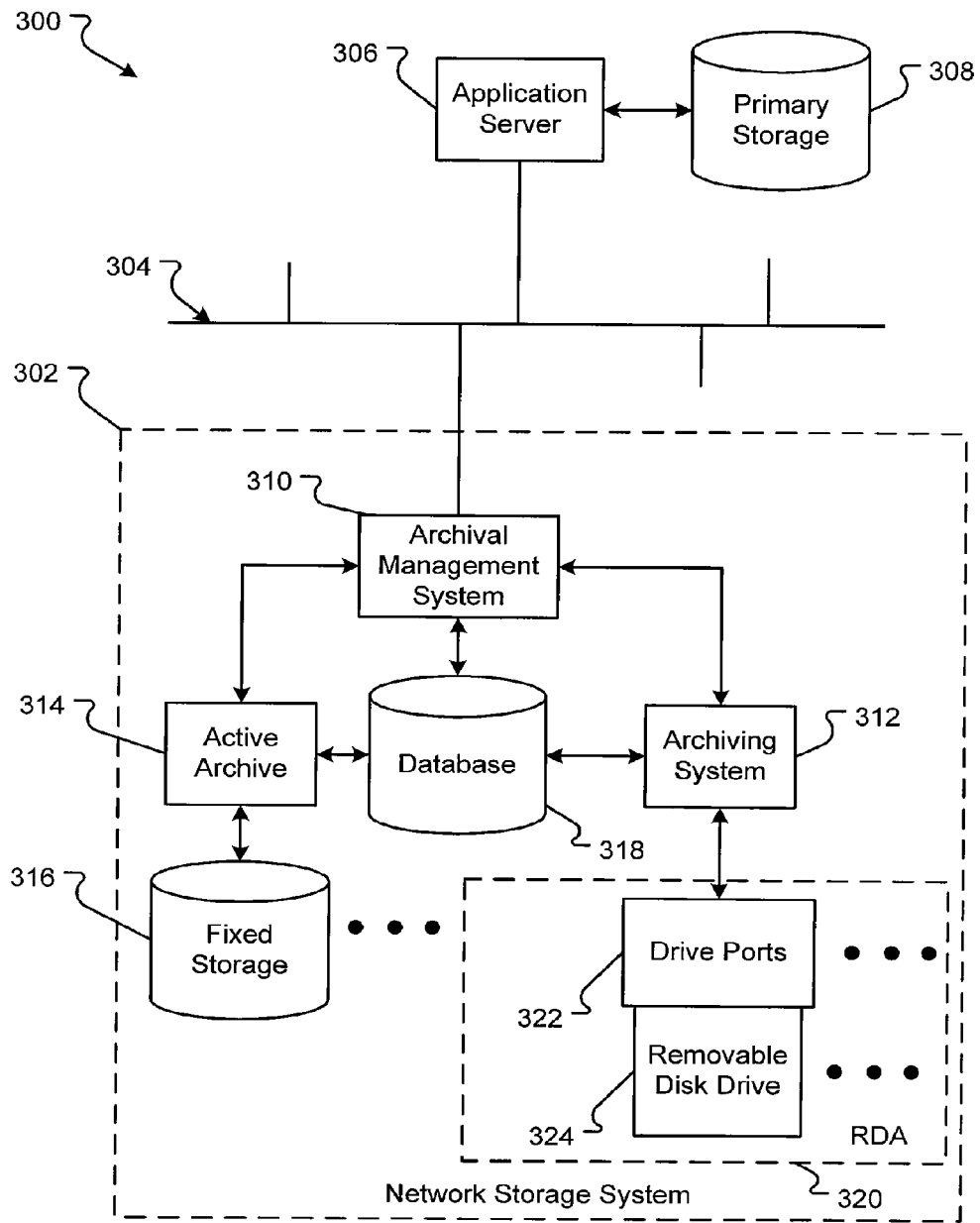
FIG. 3 is a functional block diagram of an embodiment of an archiving system.

A block diagram of an archiving system 300 is shown in FIG. 3. The archiving system 300 has one or more functional components that, in embodiments, includes a network storage system 302 in communication with a network 304. The network 304 may be any type of communication infrastructure, for example, one or more of, but not limited to, a wide-area network (WAN), local area network (LAN), wireless LAN, the Internet, etc. The network storage system 302 may communicate with one or more other systems coupled to, connected to or in communication with the network 304. For example, the network storage system 302 communicates with an application server 306. Communications between systems on the network 304 may occur by any protocol or format, for example, Transmission Control Protocol/Internet Protocol (TCP/IP), Hyper Text Transfer Protocol (HTTP), etc.

The network storage system 302, in embodiments, comprises one or more functional components embodied in hardware and/or software. In one embodiment, the network storage system 302 comprises an archiving system 312 in communication with one or more drive ports 322 that are in communication with one or more removable disk drives 324. The drive ports 322 and removable disk drives 324 are the same or similar in function to those components described in conjunction with FIGS. 1 and 2. The archiving system 312 controls the function of the one or more drive ports 322 and writes the archived data to one or more predetermined removable disk drives 324 in the one or more drive ports 322.

In further embodiments, the network storage system 302 comprises an archival management system 310. The archival management system 310 receives data for archiving from one or more systems on the network 304. Further, the archival management system 310 determines to which system or removable disk drive 324 the data should be archived, in which format the data should be saved, and how to provide security for the network storage system 302. In embodiments, the archival management system 310 provides a partitioned archive such that the network storage system 302 appears to be an independent file system to each separate application server 306, yet maintains the archive for multiple application servers 306. Thus, the archival management system 310 manages the network storage system 302 as multiple, independent file systems for one or more application servers 306. In embodiments, the archival management system 310 and the archiving system 312 are functional components of the archiving system appliance 210 (FIG. 2).

In embodiments, the archival management system 310 saves archival data to both the archiving system 312 and an active archive 314. The active archive 314, in embodiments, controls, reads from and writes to one or more fixed storage devices 316 that allow easier access to archived data. In embodiments, fixed storage 316 is similar in function to fixed storage 216 (FIG. 2). The active archive 314 performs similar functions to the archiving system 312 but for the fixed storage devices 316. In embodiments, the active archive 314 and the fixed storage devices 316 are components of the hardware fixed storage system 216 (FIG. 2). In alternative embodiments, the active archive 314 partitions the fixed storage 316 to mirror the associated application layer partitions in the RDA 320. The application layer partition(s) in the active archive 314 may have boundaries associated with memory addresses in the fixed storage 316.

The archival management system 310 may also provide an intelligent storage capability. Each type of data sent to the network storage system 302 may have different requirements and controls. For example, certain organizations, such as the SEC, Food and Drug Administration (FDA), European Union, etc., have different requirements for how certain data is archived. The SEC may require financial information to be kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310 can apply controls to different portions of the RDA 320 and the active archive 314 according to user-established data storage requirements. In one embodiment, the archival management system 310 creates application layer partitions in the archive that span one or more removable disk drives 324 and one or more portions of the fixed storage 316. All data to be stored in any one application layer partition can have the same requirements and controls. Thus, requirements for data storage are applied to different drive ports 222 (FIG. 2) in the modular drive bays 212 and 214 (FIG. 2) and to the removable disk drives 224 (FIG. 2) stored in those drive ports 222 (FIG. 2). Further, the requirements are likewise applied to different portions of the fixed storage 316 in the active archive 314. If a removable disk drive is replaced, the same storage requirements, in embodiments, are applied to the replacement removable disk drive 324 because of its location in the controlled drive port. As such, the archival management system 310 can individually maintain separate sets of data using different controls, even in different removable disk drives.

The network storage system 302 may also comprise a database 318 in communication with the archival management system 310. The database 318 is, in embodiments, a memory for storing information related to the data being archived. The database 318 may include HDDs, ROM, RAM or other memory either internal to the network storage system 302 and/or the archival management system 310 or separate as a discrete component addressable by the archival management system 310. The information stored in the database 318, in embodiments, includes one or more of, but is not limited to, data identification, application server identification, time of storage, removable disk drive identification, data format, encryption keys, application layer partition organization, etc.

The network 304, in embodiments, connects, couples, or otherwise allows communications between one or more other systems and the network storage system 302. For example, the application server 306 is connected to the network storage system 302 via the network 304. The application server 306 may be a software application, for example, an email software program, a hardware device, or other network component or system. The application server 306, in embodiments, communicates with a memory that functions as the application server's primary storage 308. The primary storage 308 is, in embodiments, a HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302 to archive the data. The application server 306 may send the data by any network protocol, such as TCP/IP, HTTP, etc., over the network 304 to the network storage system 302. The data is received at the archival management system 310. The archival management system 310, in embodiments, sends the data to one or both of the active archive 314 and/or the archiving system 312 to be archived.

Figure 4A:
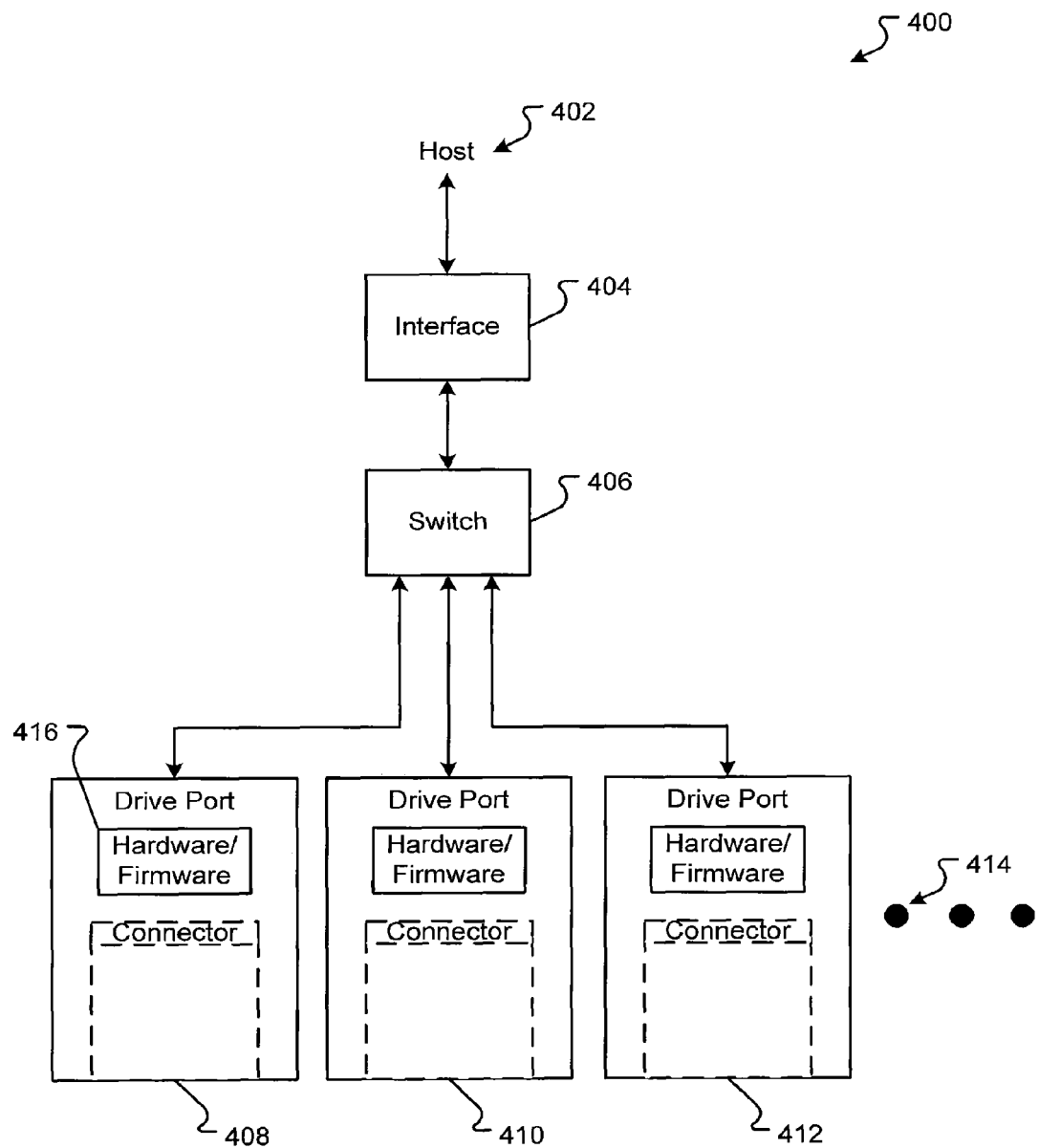
FIGS. 4A and 4B are hardware block diagrams of embodiments of a modular drive bay having an array of two or more removable disk drives.
Figure 4B:
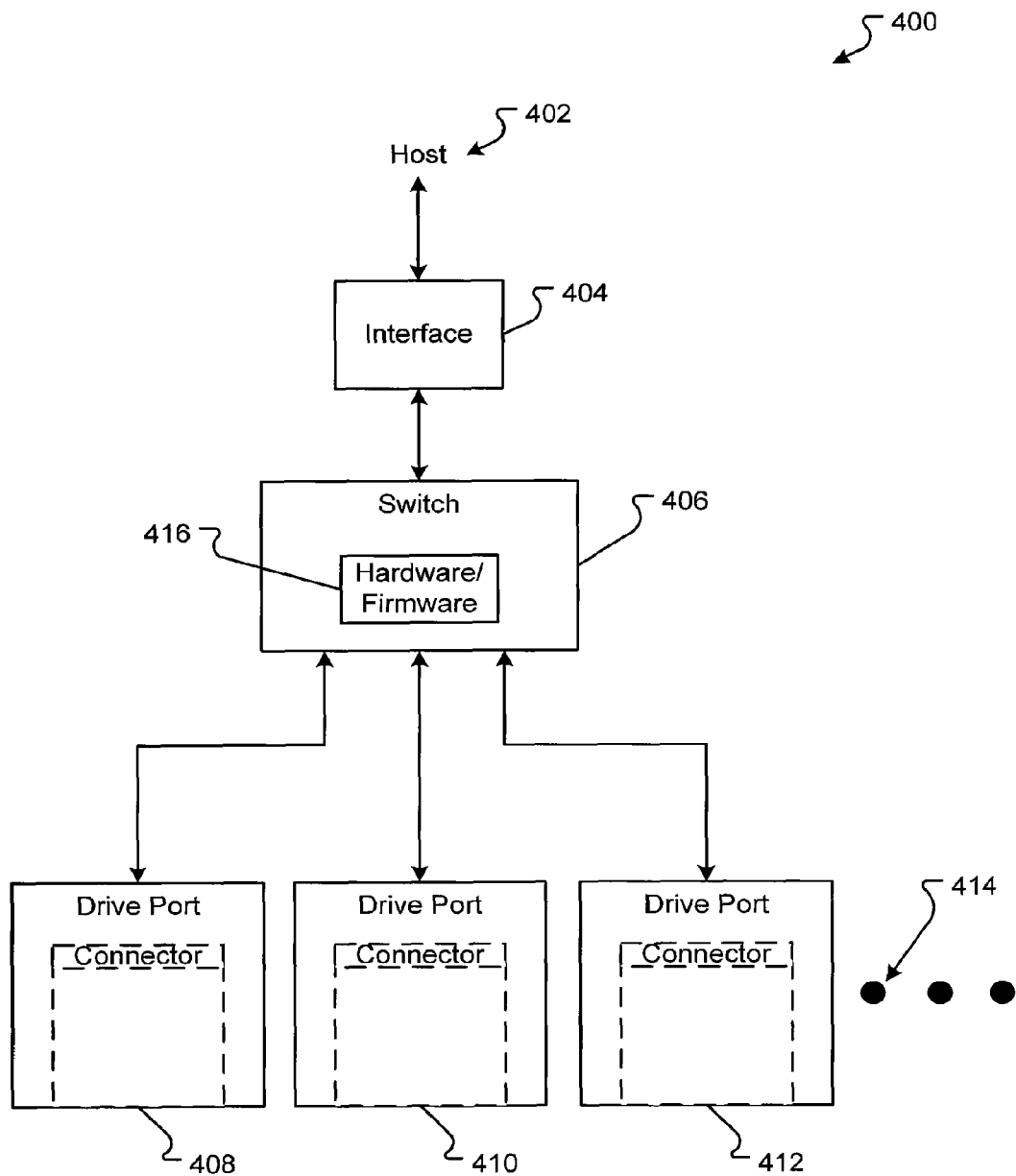

Embodiments of a modular drive bay 400 are shown in FIG. 4A and FIG. 4B. The modular drive bay 400 may be the same or similar to modular drive bay 212 (FIG. 2). The modular drive bay 400 comprises, in embodiments, an interface 404, a switch 406, and two or more drive ports 408, 410, and/or 412. The modular drive bay 400, in embodiments, has one or more removable disk drives inserted into one or more of the drive ports to store archival data. In embodiments, the modular drive bay 400 has more drive ports than those shown in FIGS. 4A and 4B, as represented by ellipses 414. In embodiments, the two or more drive ports 408, 410, and/or 412 each include a hardware/firmware 416 that executes one or more operations on removable disk drive(s) inserted into the drive port(s). The hardware/firmware 416 is explained in conjunction with FIGS. 5 and 6.

The interface 404, in embodiments, receives commands or other information from the host 402 and sends data or other information to the host 402. The interface 404 may be a SATA interface. In other embodiments, the interface 404 is a USB, Firewire, or other interface. The interface 404 can send commands or information to or received data or information from the switch 406.

In embodiments, the switch 406 is a switch that receives one or more signals from one or more communication channels and redirects the signals to two or more drive ports 408, 410, and/or 412. In embodiments, the switch 406 communicates with two or more interfaces 404. Each interface 404 may direct commands to or receive data from any one of the drive ports 408, 410, and/or 412. The switch 406, in embodiments, is an electrical switch that receives a drive port identifier, such as a drive port number or GUID, and directs communications to the addressed drive port. The drive ports 408, 410, and/or 412 may then interface with the removable disk drives within the drive ports 408, 410, and/or 412. The switch may be an Emulex FibreSpy Model 870 Embedded Storage Switch.

Another embodiment of the modular drive bay 400 is shown in FIG. 4B. The components, having the same reference label, in FIG. 4B are the same as the component described in conjunction with FIG. 4A. In this example, the hardware/firmware 416 is incorporated with the switch 406. As such, any interaction with a removable disk drive in one of the drive ports 408, 410, and/or 412 may be executed with a single set of hardware/firmware 416. This modification eliminates the redundant hardware/firmware 416 in the several drive ports 408, 410, and/or 412. In embodiments, the switch 406 still redirects communications, but can redirect communications from the hardware/firmware 416 to the drive ports 408, 410, and/or 412 or may send the address of one of the drive ports 408, 410, and/or 412 to the hardware/firmware 416. The hardware/firmware 416 may then communicate with the drive ports 408, 410, and/or 412 using the address.

Figure 5:
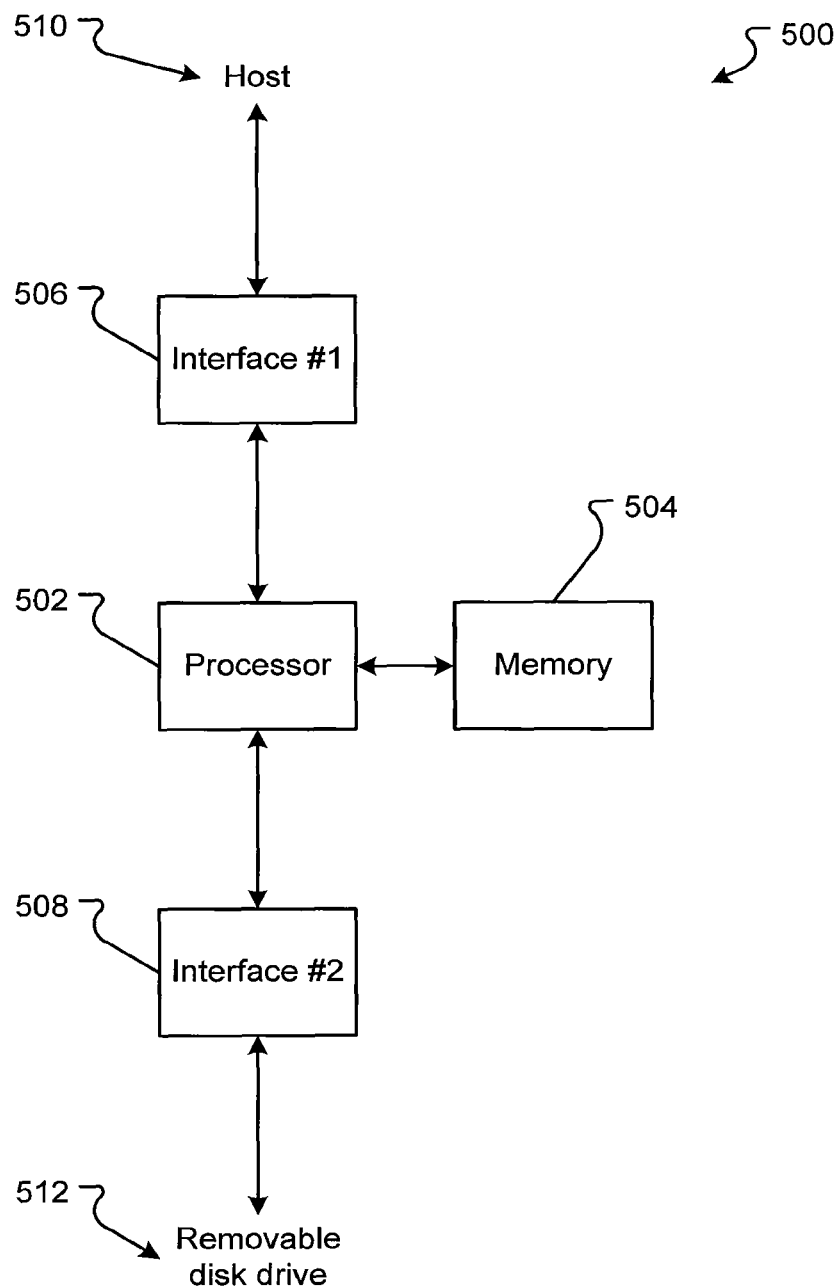
FIG. 5 is a hardware block diagram of an embodiment of a modular drive bay having an array of two or more removable disk drives.

Embodiments of the hardware/firmware 500 of the modular drive bay is shown in FIG. 5. In embodiments, the hardware/firmware 500 is the same or similar to hardware/firmware 116 explained in conjunction with FIG. 1 or hardware/firmware 416 described in conjunction with FIGS. 4A and 4B. The hardware/firmware 500, in embodiments, comprises a first interface (interface #1) 506, a processor 502, a memory 504, and/or a second interface (interface #2) 508. In embodiments, the first interface 506 receives archival data from the host 510 for storage in a removable disk drive 512 and/or sends archived data from the removable disk drive 512 to the host 510. Removable disk drive 512 is, in embodiments, the same or similar to removable disk drive 102 described in conjunction with FIG. 1. In embodiments, the host 510 is the archiving system appliance 210 (FIG. 2) and/or archiving system 312 (FIG. 3). The first interface 506 can be any type of interface operable to communicate with the host 510. The first interface 506 can be a Firewire, USB, SATA, or other interface.

The processor 502 is operable to execute software or firmware stored in memory 504 for storing or retrieving archival data from the removable disk drive 512. The processor 502, in embodiments, is any processor known in the art for executing the functions described herein. For example, the processor 502 is an Intel® Pentium®, ASIC, FPGA, or other device. The processor 502 interfaces with the first interface 506 to receive archival data for storage and send data requested from the host 510. The processor 502 further interfaces with the second interface 508 to send data to the removable disk drive 512 and read data from the removable disk drive 512. The memory 504 may be any type of memory including RAM, ROM, disk drive, etc. The memory 500 may store data or metadata and interfaces with the processor 502.

In embodiments, the second interface 508 retrieves archival data from the removable disk drive 512 to send to the host 510 and sends archival data to the removable disk drive 512 for storage. The second interface 508 can be any type of interface operable to communicate with the removable disk drive 512. The second interface 508 can be a Firewire, USB, SATA, or other interface.

Figure 6:
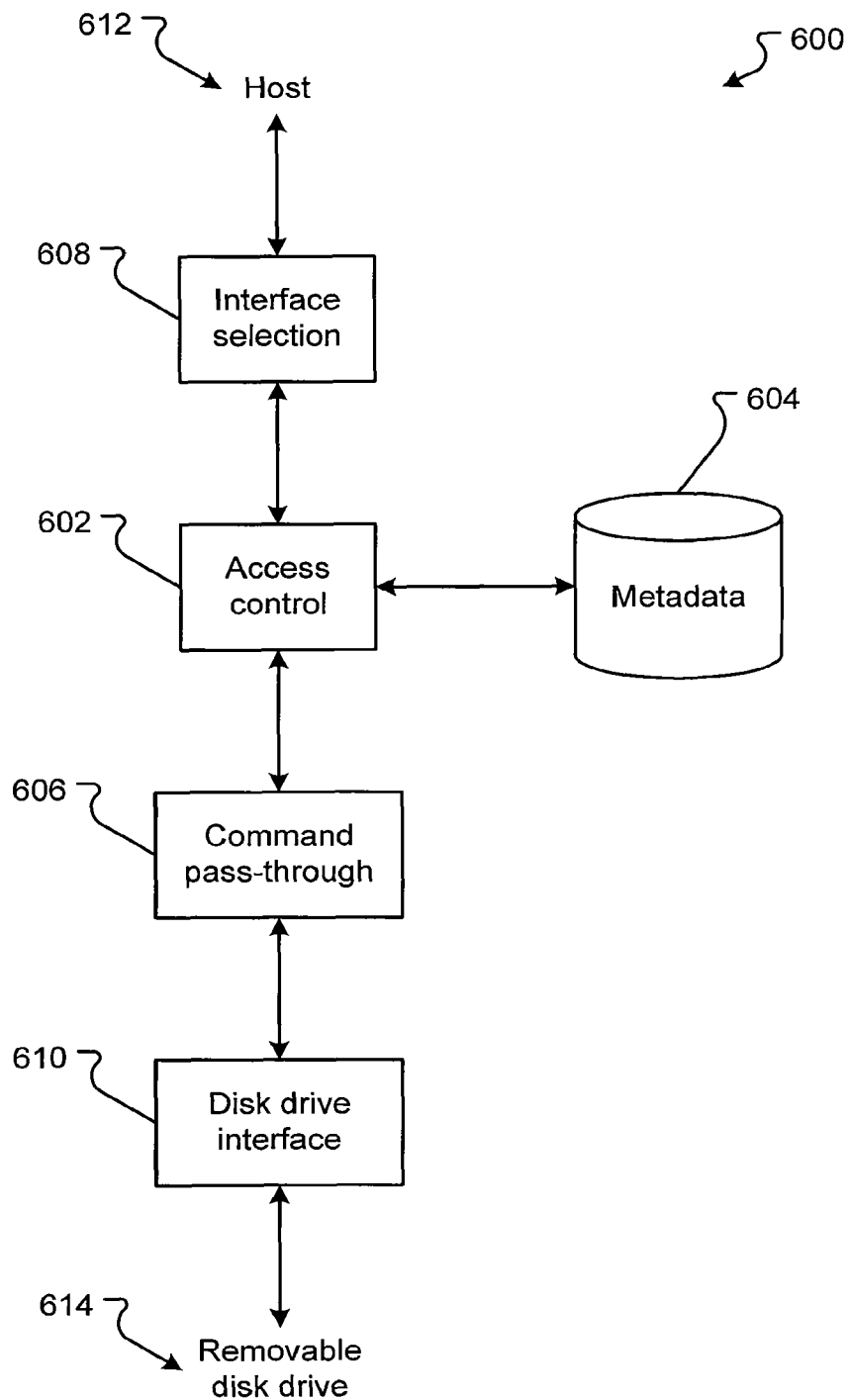
FIG. 6 is a functional block diagram of an embodiment of a modular drive bay.

A functional block diagram of an embodiment of the hardware/firmware 600 of the modular drive bay is shown in FIG. 6. In embodiments, the hardware/firmware 600 is the same or similar to hardware/firmware 116 explained in conjunction with FIG. 1 or hardware/firmware 416 described in conjunction with FIG. 4. In embodiments, the hardware/firmware 600 represents software executed in the modular drive bay 400 (FIG. 4). The hardware/firmware 600, in embodiments, comprises an interface selection module 608, an access control module 602, a metadata datastore 604, a command pass-through module 606, and/or a disk drive interface 610.

In embodiments, the interface selection module 608 receives requests from the host 612 to store or retrieve archival data. The host 612 may send the requests with a predetermined address for the archival data. The interface selection module 608 can extract the address received from the host 612 to which to store or retrieve the archival data. This address is, in embodiments, provided to the access control module 602.

The access control module 602 is operable to read metadata from the metadata datastore 604. The access control module 602, in embodiments, builds the metadata datastore 604 by reading the metadata from one or more removable disk drives 614 and storing the metadata in a table or other data structure in the metadata datastore 604. In embodiments, the metadata datastore 604 provides a first available block address to store data in a removable disk drive 614. The first available block address can be used by the access control module 602 to determine where to begin to store data. The access control module 602 can be executed within the processor 502 (FIG. 5).

In embodiments, the command pass-through module 606 sends the commands to the removable disk drive 614. For example, if the request from the host 612 is for a read of data, the command pass-through module 606 executes a read on the removable disk drive 614. The requested command sent from the host 612 may be in one format or comply with one file system format or protocol. The command pass-through module 606 may change the command to a command understandable by the removable disk drive 614. In further embodiments, the access control module 602 provides the command pass-through module 606 with the first available block address to ensure the command pass-through module 606 stores data at the correct address in the removable disk drive 614.

The disk drive interface 610, in embodiments, is a disk drive driver or other software that allows the command pass-through module 606 to interface with the removable disk drive 614. Thus, the disk drive interface 610 may convert commands for the removable disk drive 614.

Figure 7:
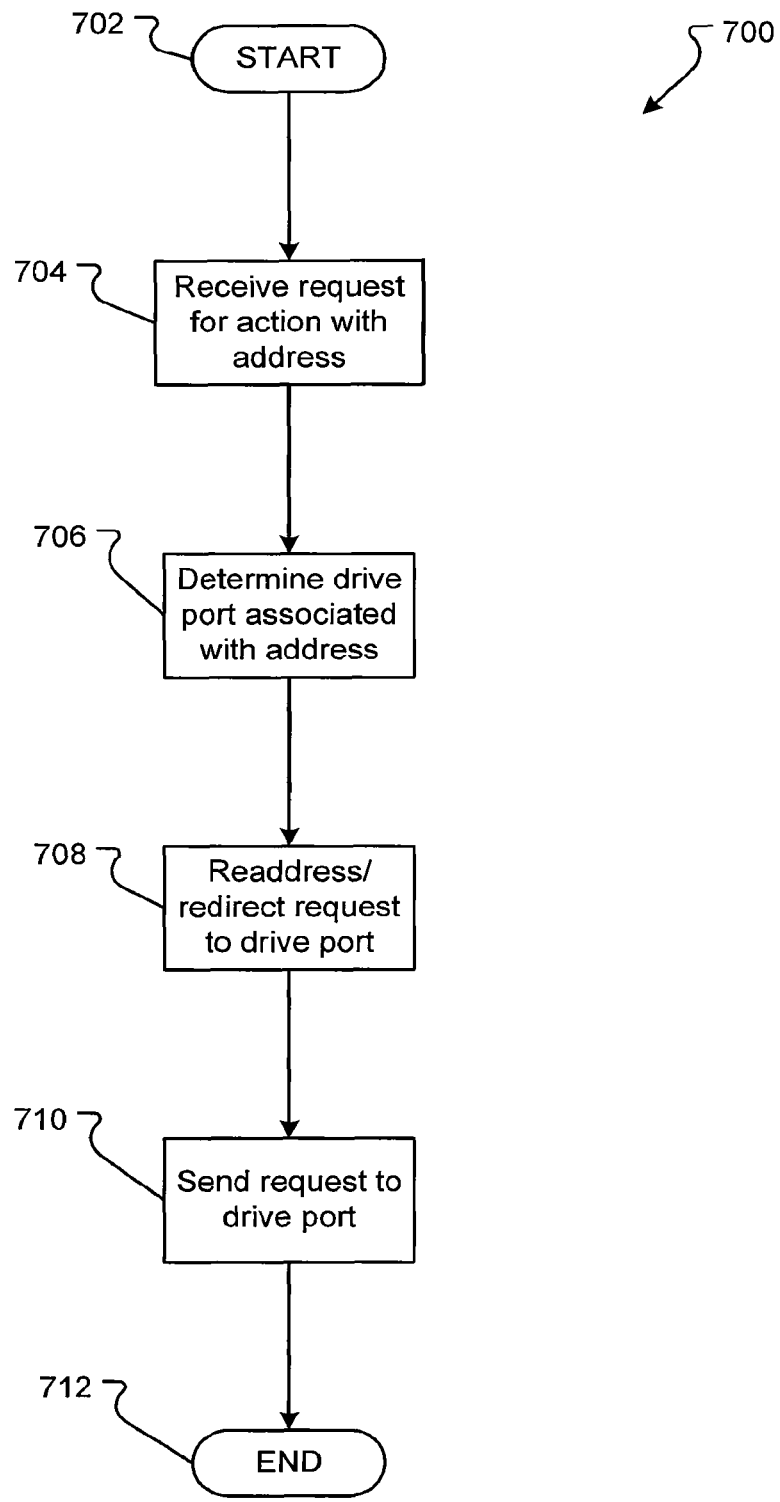
FIG. 7 is a flow diagram of an embodiment of a method for storing data on a removable disk drive.

An embodiment of a method 700 for storing data in an archive is shown in FIG. 7. In embodiments, the method 700 generally begins with a START operation 702 and terminates with an END operation 712. The steps shown in the method 700 may be executed in a computer system as a set of computer executable instructions. While a logical order is shown in FIG. 7, the steps shown or described can, in some circumstances, be executed in a different order than presented herein.

Receive operation 704 receives a request for an action, whether a data retrieval, data storage, or other action, with an address. In embodiments, the address is for a removable disk drive 102 (FIG. 1) inserted into a modular drive bay 400 (FIG. 4). In other embodiments, the address is directed to one of several drive ports 408, 410, and/or 412 (FIG. 4) in the modular drive bay 400 (FIG. 4). The archiving system 312 (FIG. 3) receives the request and forwards the request to the modular drive bay 400 (FIG. 4).

Determine operation 706 determines a drive port associated with the address. In embodiments, the access control module 602 (FIG. 6) reads the address for the removable disk drive 102 (FIG. 1) and finds a drive port 408, 410, or 412 (FIG. 4) associated with the removable disk drive 102 (FIG. 1). For example, the access control module 602 (FIG. 6) can create a metadata table or other data structure in the metadata datastore 604 (FIG. 6) stored in memory 504 (FIG. 5). Further, the access control module 602 (FIG. 6), in embodiments, reads a table associating identifiers or addresses for the removable disk drive(s) 102 (FIG. 1) with one of the drive ports 408, 410, and/or 412 (FIG. 4). This associated address for the drive port 408, 410, or 412 (FIG. 4) may then be read from the metadata. In another embodiment, the address is for one of the drive ports 408, 410, and/or 412 (FIG. 4). The address may then be read or extracted from the request.

Readdress/redirect operation 708 readdresses the request to the removable disk drive 102 (FIG. 1) associated with one of the drive ports 408, 410, and/or 412 (FIG. 4) or redirects the request to one of the drive ports 408, 410, and/or 412 (FIG. 4). In embodiments, the access control module 602 (FIG. 6) in the hardware/firmware 416 (FIG. 4B) or the switch 406 (FIG. 4B) readdresses the request by replacing the address for the removable disk drive 102 (FIG. 1) with an address for one of the drive ports 408, 410, and/or 412 (FIG. 4). In other embodiments, the switch 406 (FIG. 4A) redirects the request to the line or wire associated with the addressed drive port 408, 410, or 412.

Send operation 710 sends the request to the drive port 408, 410, or 412 (FIG. 4) associated with the determined address. In embodiments, the access control module 602 (FIG. 6) provides the request and address to the command pass-through module 606 (FIG. 6), which sends the request to the drive port 408, 410, or 412 (FIG. 4). The command pass-through 606 (FIG. 6) generates a command signal with the address and sends the request to the disk drive interface 610 (FIG. 6) for communication through the second interface 508 (FIG. 5) to the removable disk drive 102 (FIG. 1) in the addressed drive port 408, 410, or 412 (FIG. 4). In another embodiment, the switch 406 (FIG. 4B) sends the request to the address associated with the drive port 408, 410, or 412 (FIG. 4). The first interface 506 (FIG. 5) at the drive port 408, 410, or 412 (FIG. 4) may then receive the request for the removable disk drive 102 (FIG. 1).

In light of the above description, a number of advantages of the present disclosure are readily apparent. For example, the modular drive bay allows for expandability of the system with little or no reconfiguration. If a new removable disk drive is inserted into the system, the modular drive bay can associate the identifier of the new removable disk drive with a drive port and continue to communicate with the drive port. In other embodiments, the modular drive bay continues to communicate with the drive port without an association being completed. As such, the modular drive bay can switch between removable disk drives and expand the amount of storage capacity nearly seamlessly.

A number of variations and modifications can also be used. For example, another switch may be placed between the archiving system and the one or more modular drive bays. As such, more modular drive bays may be added without great configuration changes. Further, the switch may be a LAN switch and allow modular drive bays to be located in various locations.

While the principles of the disclosure have been described above in connection with specific apparatuses and methods, it is to be clearly understood that this description is made only by way of example and not as limitation on the scope of the disclosure.

What is claimed is:

1. A modular drive bay comprising:
   a plurality of removable drives operable to store archival data, each removable drive comprising:
      a data cartridge case;
      a connector coupled to the data cartridge case; and
      memory comprised within a data storage medium enclosed by the data cartridge case and in communication with the connector, the memory configured to store the archival data;
   a plurality of drive ports configured for insertion of the removable drives, each drive port including a data cartridge connector operable to mate with one of the removable drives in order to communicate with the memory therein;
   a datastore for metadata associating each of the removable drives with one of the drive ports; and
   a hardware/firmware switch connected to the datastore and configured to:
      receive a request for data storage or retrieval, the request including an address of one of the removable drives;
      extract the address from the request;
      read the datastore to determine which of the plurality of drive ports is associated with the address;
      replace the address extracted from the request with an address of the associated drive port; and
      redirect the request from the removable drive addressed in the request to the associated drive port, the addressed removable drive being inserted therein.

2. The modular drive bay of claim 1, further comprising a server interface configured to receive the request from a server.

3. The modular drive bay of claim 2, further comprising a pass-through module configured to send the request to the drive port associated with the address extracted from the request.

4. The modular drive bay of claim 3, further comprising a drive interface configured to interface the pass-through module with the removable disk drive addressed in the request.

5. The modular drive bay of claim 4, further comprising a processor configured to execute the request on the memory of the removable drive addressed in the request, in the drive port associated with the address extracted from the request.

6. The modular drive of claim 1, wherein the drive bay comprises a single hardware/firmware switch configured for interacting with the plurality of removable drives in the plurality of drive ports.

7. The modular drive bay of claim 1, further comprising redundant hardware/firmware switches configured for interacting with the plurality of removable drives in each of the drive ports.

8. The modular drive bay of claim 1, wherein the memory is comprised within a magnetic data storage medium.

9. The modular drive bay of claim 1, wherein the memory is comprised a flash memory data storage medium.

10. The modular drive bay of claim 1, wherein the memory is comprised within an optical data storage medium.

11. A storage system for archival data, the system comprising:
   a plurality of removable data cartridges, each removable data cartridge comprising:
      a storage medium for storing archival data; and
      a data cartridge case enclosing the storage medium;
   a plurality of drive ports configured for insertion of the removable drives, each drive port including a data cartridge connector operable to mate with one of the removable data cartridges in order to store the archival data on the storage medium thereof;
   a metadata store associating each of the removable data cartridges with one of the drive ports; and
   a processor connected to the metadata store, the processor configured to:
      receive a request for the archival data;
      extract an address for one of the data cartridges from the request;
      read the metadata store to determine which of the plurality of drive ports is associated with the data cartridge, based on the address;
      replace the address of the data cartridge with an address of the associated drive port; and
      redirect the request from the data cartridge addressed in the request to the associated drive port into which the addressed data cartridge is inserted, as determined by the metadata store.

12. The system of claim 11, further comprising a first interface in communication with the processor, the first interface configured to receive the request from a host over a network.

13. The system of claim 12, further comprising a second interface in communication with the processor, the second interface configured to send the request to the data cartridge addressed in the request, as inserted into the drive port associated with the data cartridge, based on the address.

14. The system of claim 11, further comprising a single set of hardware/firmware including the processor, the single set of hardware/firmware configured for interacting with the plurality of removable data cartridges in the plurality of drive ports.

15. The system of claim 11, wherein the storage medium comprises a magnetic medium.

16. The system of claim 15, wherein the metadata store provides a first available block address to store the archival data on the magnetic medium.

17. A non-transitory machine-readable storage medium having program code stored thereon, which, when executed on a processor, performs a method comprising:
   receiving a request for data stored on one of a plurality of removable data cartridges, each removable data cartridge comprising a cartridge case enclosing a data storage medium;
   extracting an address from the request, wherein the address is associated with the data cartridge on which the data are stored;
   reading metadata to determine which of a plurality of drive ports is associated with the data cartridge, based on the address;
   replacing the address associated with the data cartridge with an address of the associated drive port; and
   redirecting the request to the associated drive port, the data cartridge on which the data are stored being inserted therein.

18. The non-transitory machine-readable storage medium of claim 17, wherein redirecting the request to the associated drive port is performed such that the request is executed on the magnetic medium in the data cartridge on which the archival data are stored.

19. The non-transitory machine-readable storage medium of claim 18, wherein the data cartridge on which the archival data are stored is inserted into the drive port associated with the data cartridge based on the address extracted from the request.

20. The non-transitory machine-readable storage medium of claim 17, wherein reading metadata to determine the associated drive port comprises reading a table associating identifiers of the removable data cartridges with the drive ports.

* * * * *